(12) United States Patent
Kitzmiller et al.

(10) Patent No.: US 12,296,757 B2
(45) Date of Patent: May 13, 2025

(54) STORAGE CONTAINER FOR UTILITY TRACTORS

(71) Applicants: Matthew D. Kitzmiller, Sault Sainte Marie, MI (US); Ryan A. Kitzmiller, Sault Sainte Marie, MI (US); Ronald D. Kitzmiller, Sault Sainte Marie, MI (US)

(72) Inventors: Matthew D. Kitzmiller, Sault Sainte Marie, MI (US); Ryan A. Kitzmiller, Sault Sainte Marie, MI (US); Ronald D. Kitzmiller, Sault Sainte Marie, MI (US)

(*) Notice: Subject to any disclaimer, the term of this patent is extended or adjusted under 35 U.S.C. 154(b) by 175 days.

(21) Appl. No.: 18/308,199

(22) Filed: Apr. 27, 2023

(65) Prior Publication Data

US 2024/0190361 A1    Jun. 13, 2024

Related U.S. Application Data

(60) Provisional application No. 63/386,541, filed on Dec. 8, 2022.

(51) Int. Cl.
  *B60R 11/06* (2006.01)
  *B60R 11/00* (2006.01)

(52) U.S. Cl.
  CPC ....... *B60R 11/06* (2013.01); *B60R 2011/0057* (2013.01); *B65D 2313/04* (2013.01)

(58) Field of Classification Search
  CPC ............ B60R 2011/0057; B60R 11/06; B65D 2313/04

USPC ........ 220/477, 3.5, 483; 224/410, 544, 562; 109/50–52; 70/63; 312/249.11
See application file for complete search history.

(56) References Cited

U.S. PATENT DOCUMENTS

| | | | | |
|---|---|---|---|---|
| 269,143 A * | 12/1882 | Stanger | .................. | B60N 3/083 |
| | | | | 220/477 |
| 2,627,359 A * | 2/1953 | Woodward | ............. | H02B 1/048 |
| | | | | 220/477 |
| 2,807,841 A * | 10/1957 | Janos | .................... | F25D 23/087 |
| | | | | 49/478.1 |
| 2,965,429 A * | 12/1960 | Stanger | ................ | A47B 49/004 |
| | | | | 220/477 |
| 2,997,957 A | 8/1961 | Hall | | |
| 3,081,126 A * | 3/1963 | Theberge | .................. | B60R 7/12 |
| | | | | 224/571 |
| 3,231,292 A | 1/1966 | Lorenz | | |
| D275,012 S | 8/1984 | Sonnek | | |
| 4,655,145 A * | 4/1987 | Naylor | ...................... | E05G 1/00 |
| | | | | 109/52 |
| 4,700,848 A * | 10/1987 | Fujiki | ....................... | B60R 7/12 |
| | | | | 211/63 |
| 4,795,067 A * | 1/1989 | Hamilton | .................. | B60R 7/12 |
| | | | | 224/543 |
| 4,807,920 A * | 2/1989 | Fujiki | ....................... | B60R 7/12 |
| | | | | 211/63 |
| 5,800,004 A * | 9/1998 | Ackeret | .................... | B60R 7/12 |
| | | | | 296/37.13 |

(Continued)

*Primary Examiner* — Justin M Larson
(74) *Attorney, Agent, or Firm* — Harpman & Haroman

(57) ABSTRACT

A compact removable portable storage container for a tractor with a front-end hydraulic attachments. The storage container is of an open cylindrical configuration having a fixed end and closure cap that selectively attaches to the engagement surfaces about the insertion opening formed by the equipment attachment support structure.

2 Claims, 10 Drawing Sheets

(56) References Cited

U.S. PATENT DOCUMENTS

| | | | | |
|---|---|---|---|---|
| 7,673,481 | B2* | 3/2010 | Amir | A45C 11/32 |
| | | | | 109/54 |
| 8,496,272 | B2* | 7/2013 | Davis | B65D 43/0202 |
| | | | | 285/9.1 |
| 8,511,733 | B2* | 8/2013 | Blackmore | B60R 7/04 |
| | | | | 224/544 |
| 9,016,748 | B1* | 4/2015 | Ardigo | B60R 7/046 |
| | | | | 296/37.13 |
| 9,090,208 | B2* | 7/2015 | Marchetti | B60K 37/20 |
| 9,093,206 | B2* | 7/2015 | Davis | H01F 7/0242 |
| 9,849,843 | B2* | 12/2017 | Kogut | B60R 11/06 |
| 10,870,396 | B2* | 12/2020 | Tena Han | B60R 7/12 |
| 2005/0167457 | A1* | 8/2005 | Barnett | B60N 3/103 |
| | | | | 224/183 |
| 2008/0169290 | A1* | 7/2008 | Mangiardi | A61B 50/13 |
| | | | | 220/477 |
| 2012/0319313 | A1* | 12/2012 | Davis | F16L 55/115 |
| | | | | 261/119.1 |

* cited by examiner

STORAGE CONTAINER FOR UTILITY TRACTORS

This application claims the benefit of U.S. Provisional Application No. 63/386,541, filed on Dec. 8, 2022.

BACKGROUND OF THE INVENTION

1. Technical Field

This invention relates to storage containers that are used to hold a variety of elements typically tools and the like for transport to job sites on large power equipment such as tractors in which the operator often needs to carry auxiliary tools.

2. Description of Prior Art

Prior art portable tool box configurations are often used with tractors to provide a convenient carrying platform therewith. See for example U.S. Pat. Nos. 2,997,957, 3,231,292 and D275,012.

In U.S. Pat. Nos. 2,997,957 and 3,231,292 an elongated toolbox with a lid is disclosed requiring a custom mount to be secured independently to the tractor that will hold the containment toolbox in place on the tractor for transport.

U.S. Design Pat. D275,012 claims a tractor toolbox design configuration having a tapered hinge front opening.

SUMMARY OF THE INVENTION

An integrated removable storage container for holding and transporting tools and accessories in a front-end hydraulic loader on a tractor. The storage container fits within cylindrical openings within the loader construction and is secured by a plurality of magnets within the user engagement end closure portion of the container. The container defines an open half cylinder storage body member that provides a tool holder in a removable user-friendly format defined by easy access and durability.

DETAILED DESCRIPTION OF THE INVENTION

Figure 1:
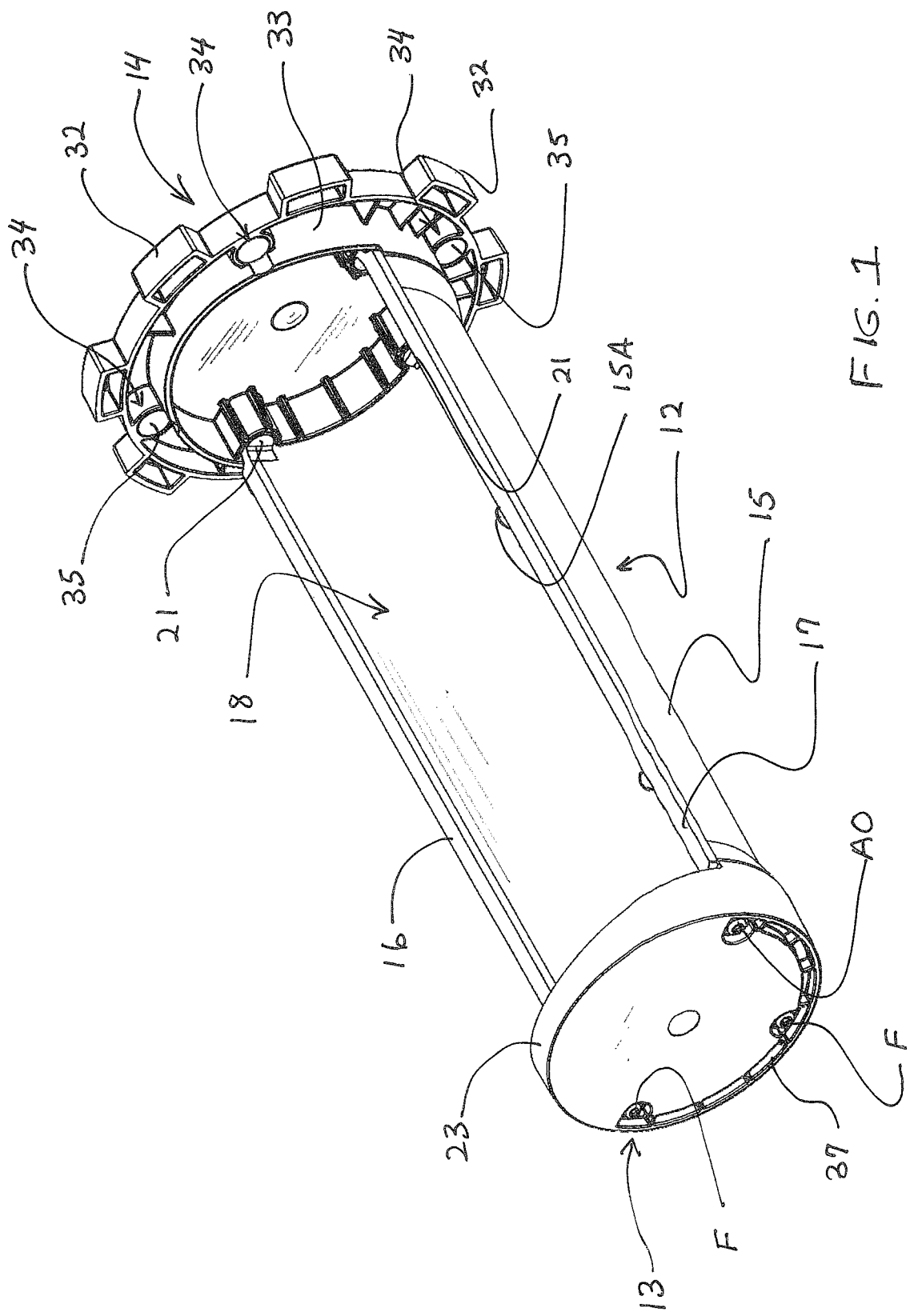
FIG. 1 is a perspective top, side and end view of the utility storage container.
Figure 2:
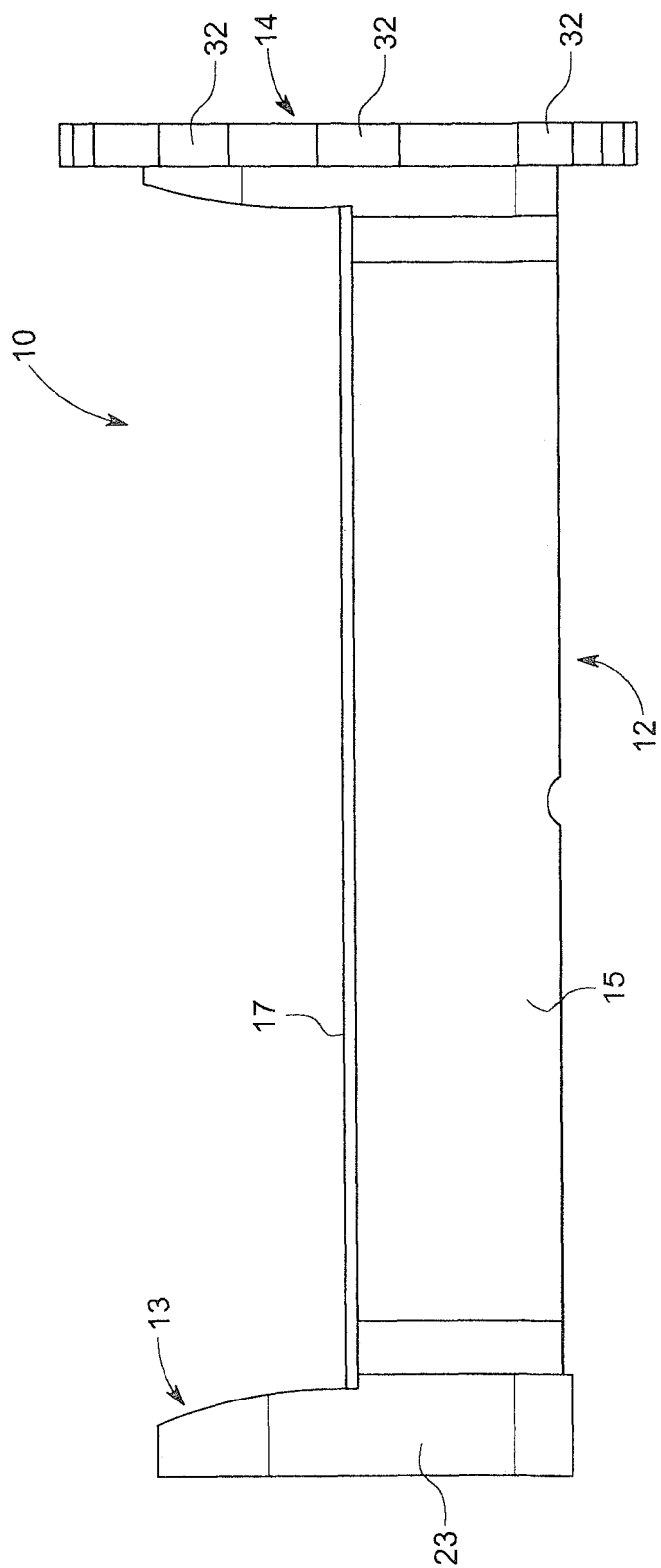
FIG. 2 is a side elevational view thereof.

Referring now to FIGS. 1-8 of the drawings, a storage container 10 for a tractor 11 can be seen having a housing portion 12, an end portion 13 and oppositely disposed attached front end portion 14.

Figure 7:
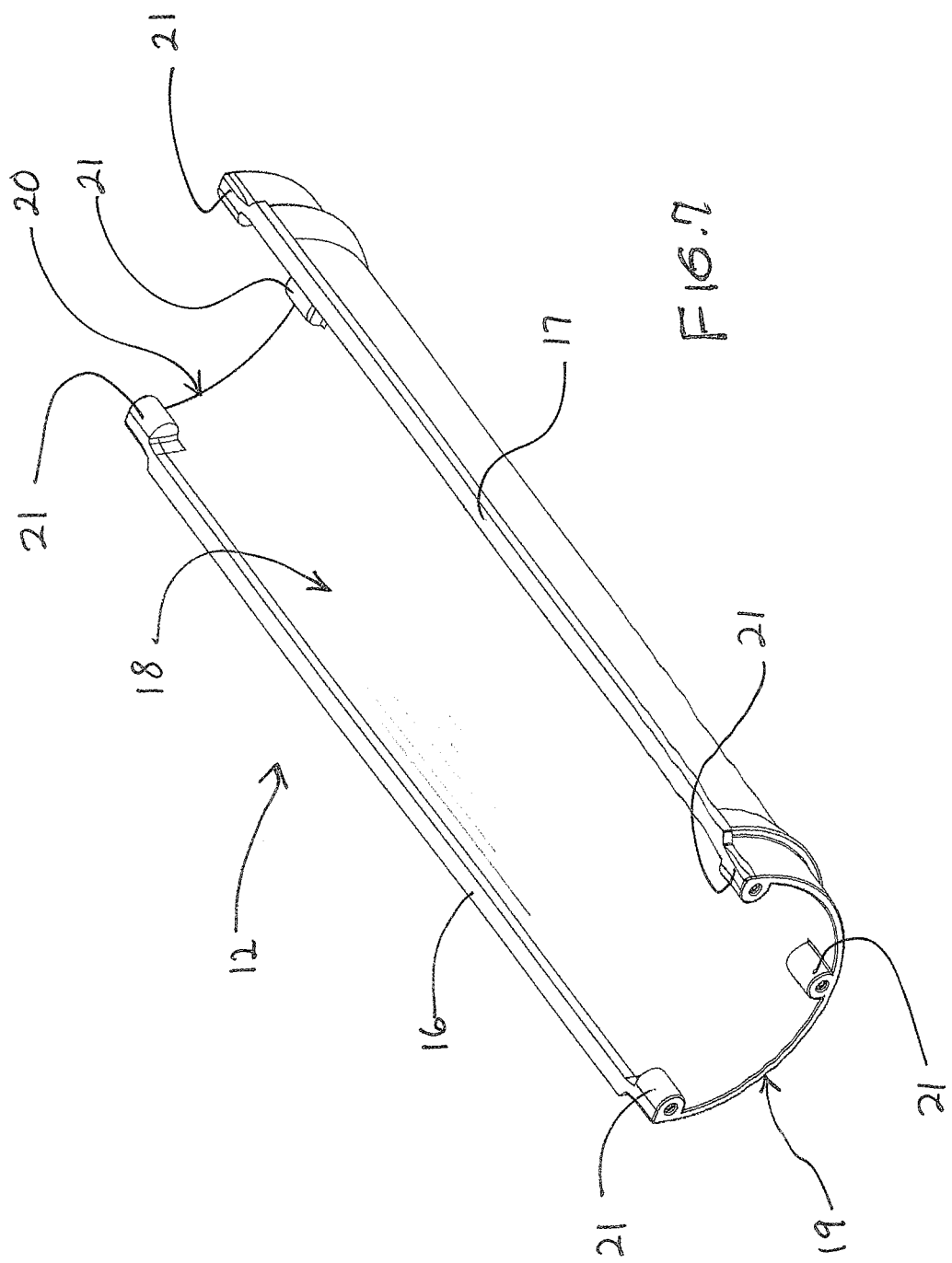
FIG. 7 is a perspective top, front and side view of the main partial cylindrical body of the storage container.

The housing portion 12 comprises a half cylinder 15 having a central drainage opening at 15A with spaced parallel elongated side edges 16 and 17 and an interconnected interior surface 18 there between with respective open ends 19 and 20 as best seen in FIG. 7 of the drawings. Each of the open ends 19 and 20 have apertured multiple mounting lugs 21 in spaced annular relation to one another in the respective cylinder ends 19 and 20.

Figure 5:
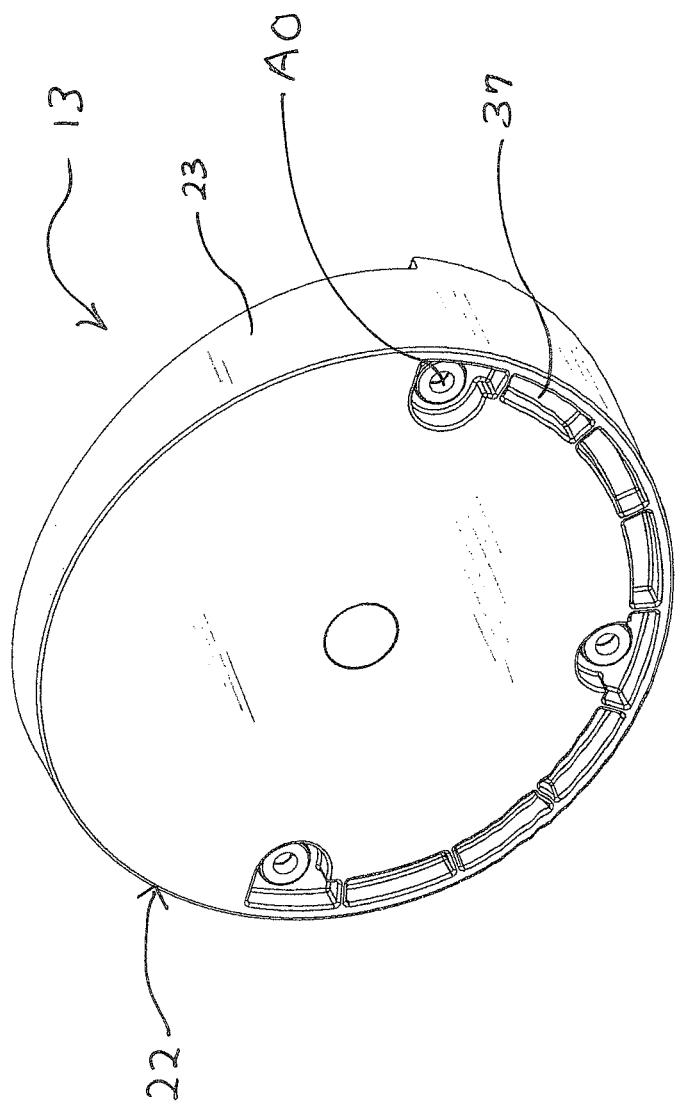
FIG. 5 is an enlarged front top and right-side perspective view of the outside of the end cap of the storage container.
Figure 6:
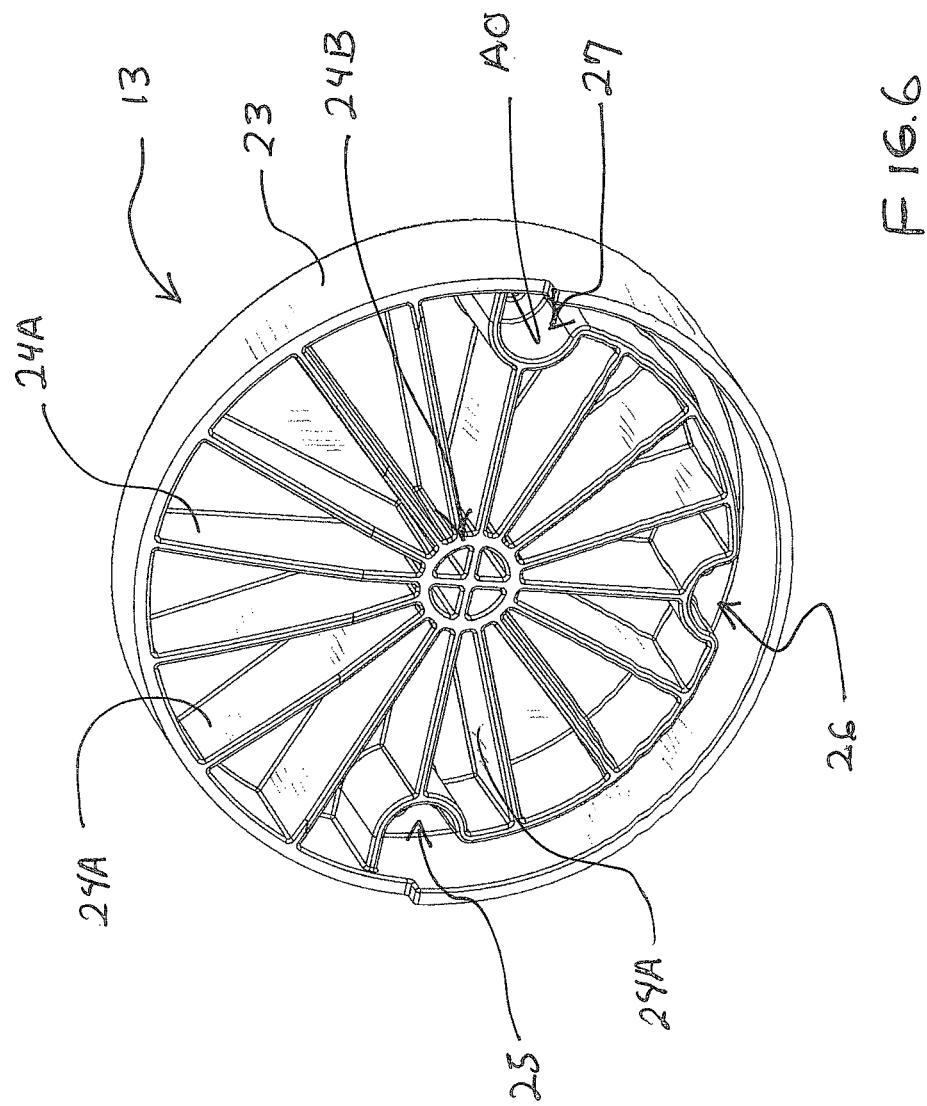
FIG. 6 is an enlarged rear, top and left side perspective view of the interior of the end cap of the storage container.

Referring now to FIGS. 5 and 6 of the drawings, the upstanding exterior and interior of the end portion 13 can be seen respectively having an annular body member 22 with a contoured annular flange 23 extending from the perimeter edge thereof. An interior registration support flange 24 extends in spaced relation thereto having lug registration fittings 25, 26 and 27 spaced thereabout for aligned registration with corresponding mounting lugs 21 utilizing multiple fasteners F shown in FIG. 8 of the drawings during assembly. A plurality of support ribs 24A extend in radially spaced relation to one another throughout from a central support raised hub 24B to the annular flange 23 and the support flange 24 about the lug registration fittings 25, 26 and 27.

Figure 3:
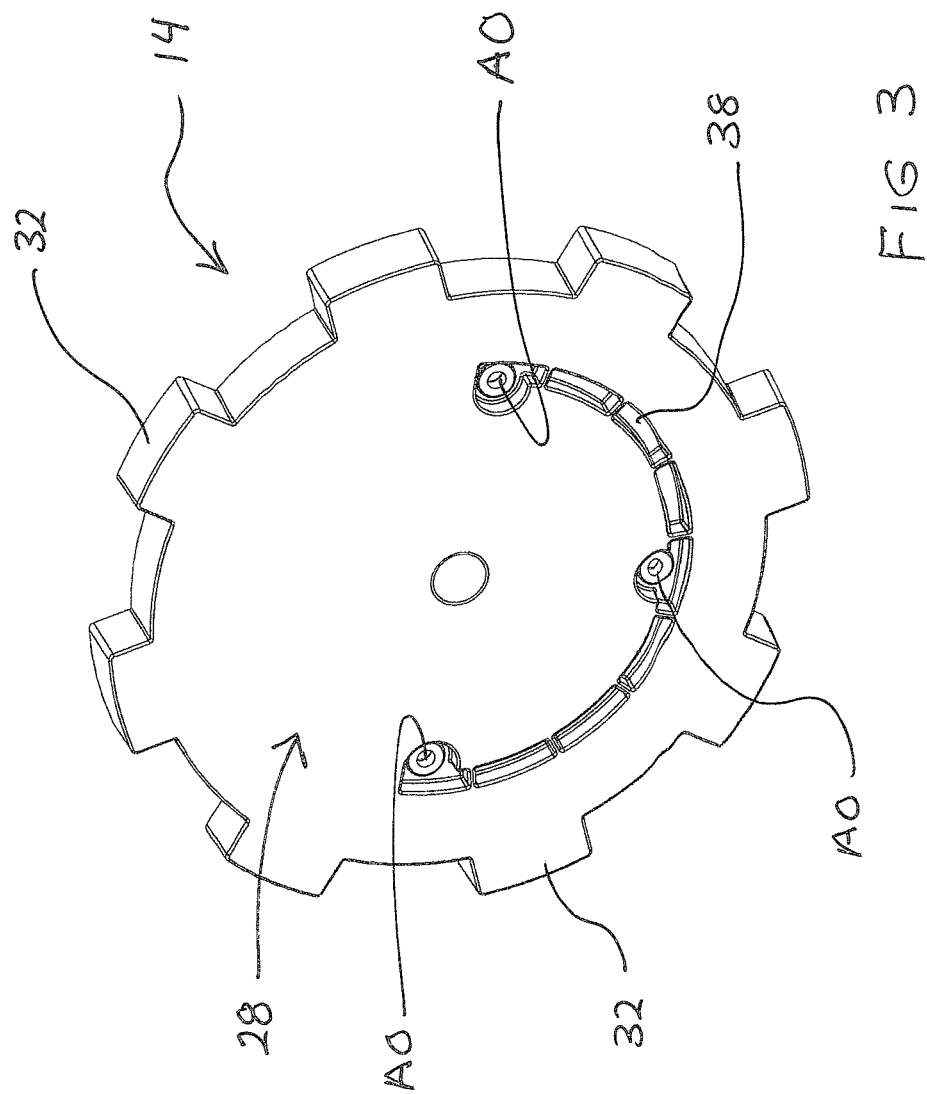
FIG. 3 is an enlarged front, top and right-side perspective view of the front closure cap of the storage container.
Figure 4:
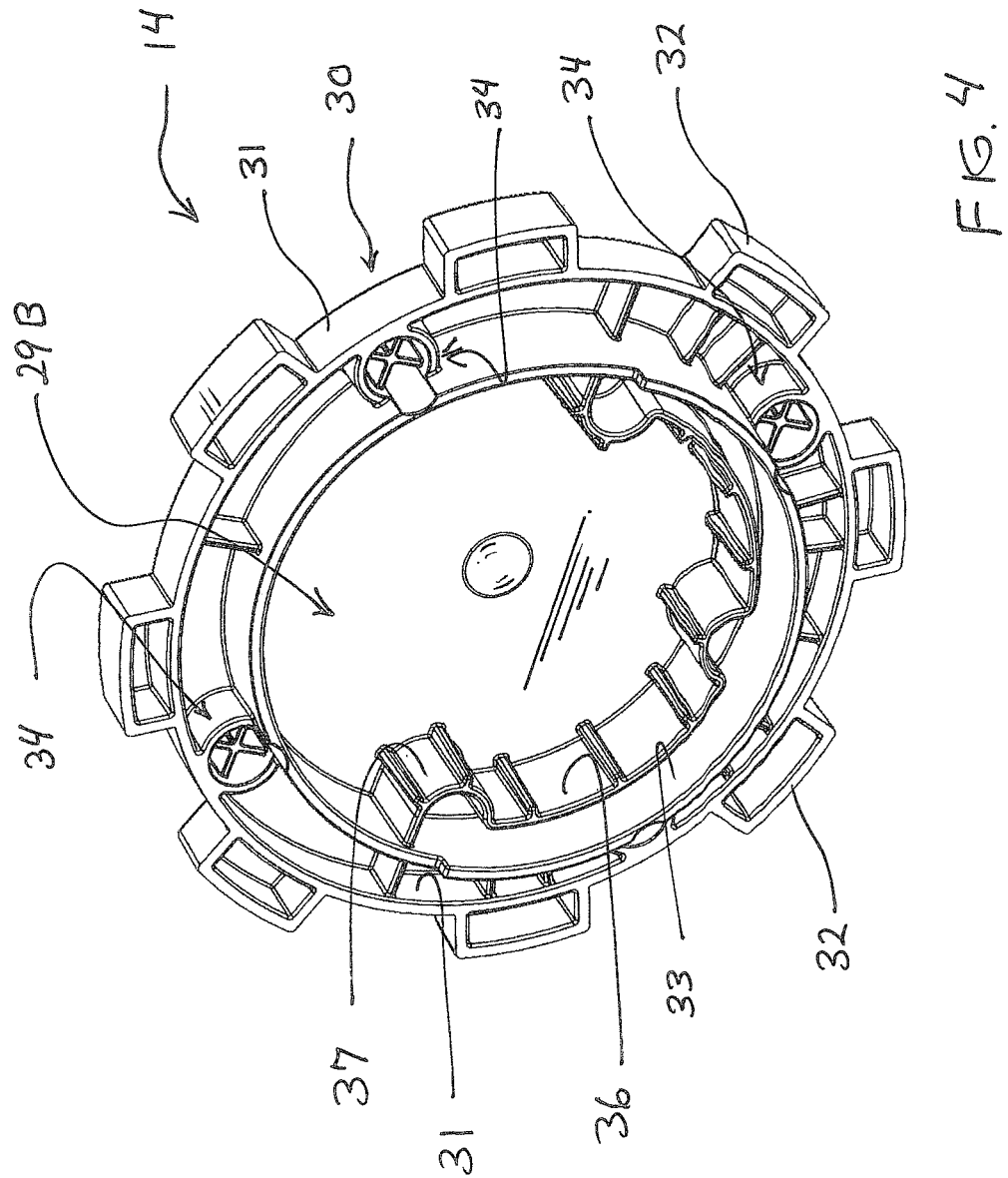
FIG. 4 is an enlarged rear, top and left side perspective interior view thereof.

Correspondingly, the attachment user end engagement front end portion 14 of the storage container 10, as seen best in FIGS. 3 and 4 of the drawings, has an outer flat surface 28 and an inner surface 29 defining a main body member 30.

Figure 8:
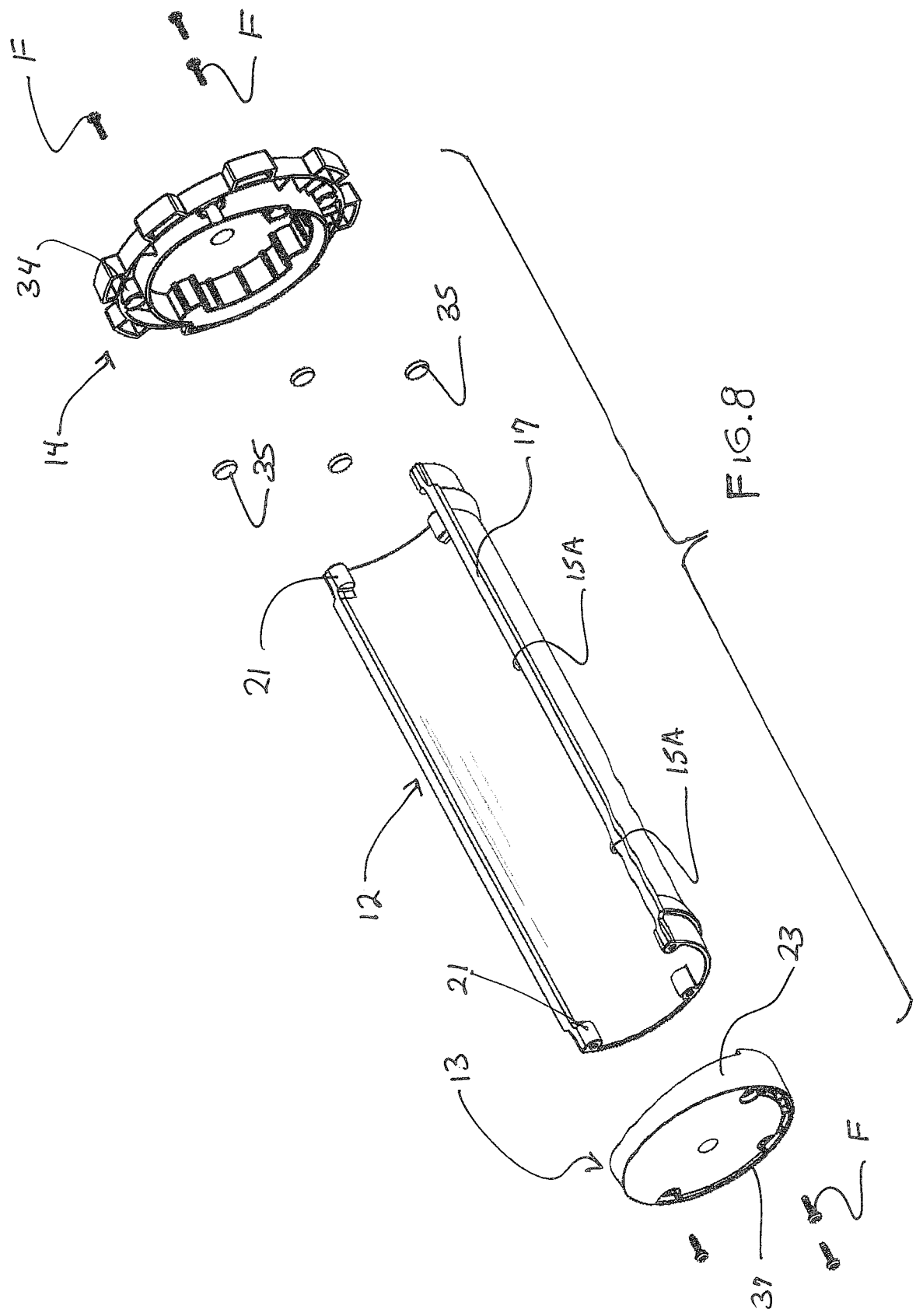
FIG. 8 is an exploded perspective assembly view of the storage container.

A first annular flange 31 depends from its outer perimeter surface edge and has a plurality of annular spaced upstanding contoured hollow tabs 32 formed in annular spaced relation to one another thereon for user engagement as described hereinafter. A second annular flange 33 extends from the inner surface 29B in spaced relation to the said first flange 31 and has multiple annular registration fittings 34 spaced about for securing high power attachment magnets 35 therein, as best seen in FIGS. 8 and 10 of the drawings.

A second interior registration support flange 36 extends from the interior surface 29 in spaced relation to said second annular flange 33 having lug registration receiving fittings 37 formed thereby for aligned registration with corresponding apertured lugs 21 on the respective open end 20 of the cylinder member 15 as hereinbefore described. It will be evident that upon assembly as seen in FIG. 8 of the drawings, that the respective interior end portion 13 and attachment front end portion 14 are secured to the respective cylinder open ends 19 and 20 by the multiple fasteners F through correspondingly formed access openings AO in their respective surfaces defined by respective segmented arcuate recess channels 38 and 39 as seen in FIGS. 3 and 5 of the drawings.

The assembled storage container 10 therefore defines an elongated open top storage compartment with oppositely disposed annular ends.

Figure 9:
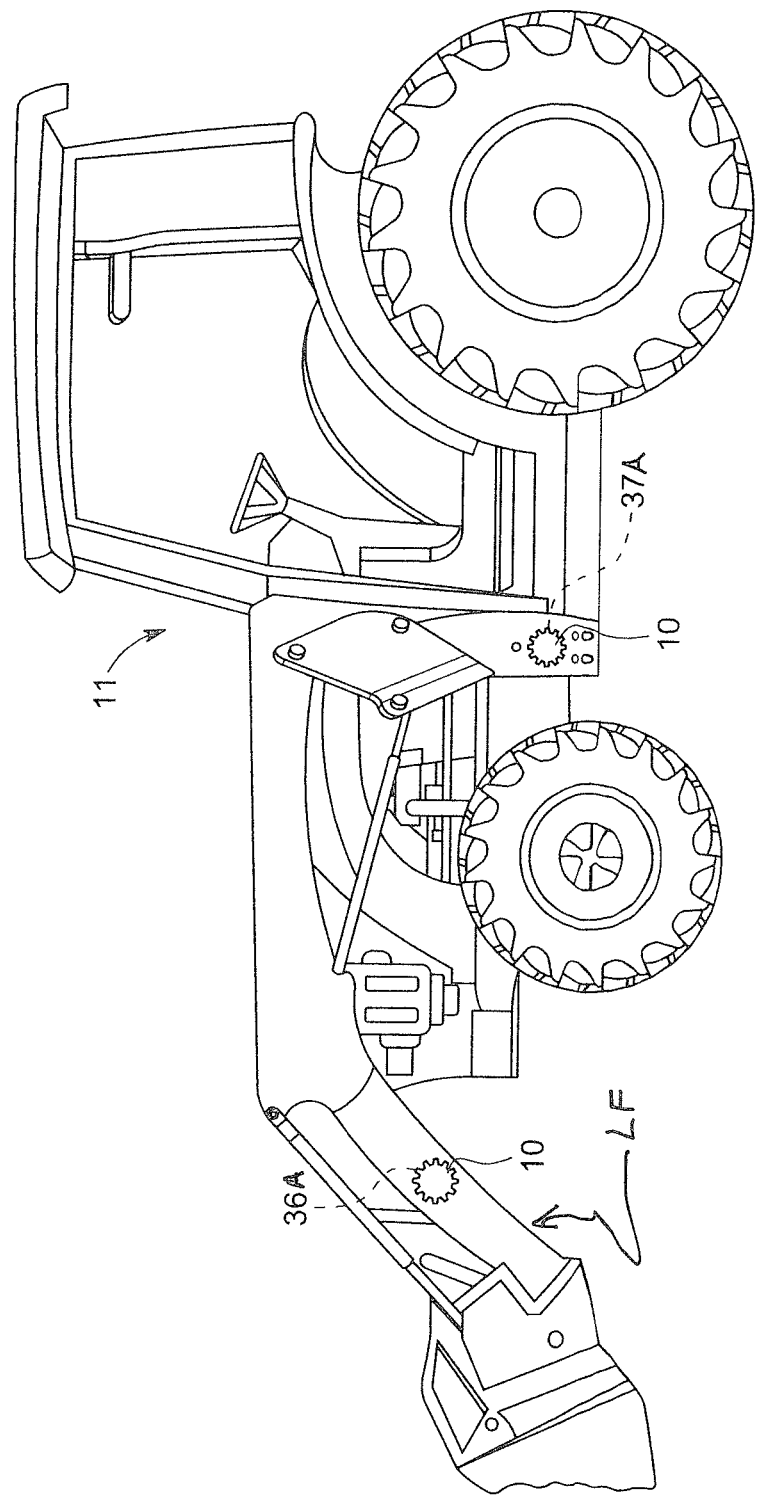
FIG. 9 is a side elevational graphic illustration of a tractor with a frame hydraulic loader attachment with storage containers of the invention positioned there within.
Figure 10:
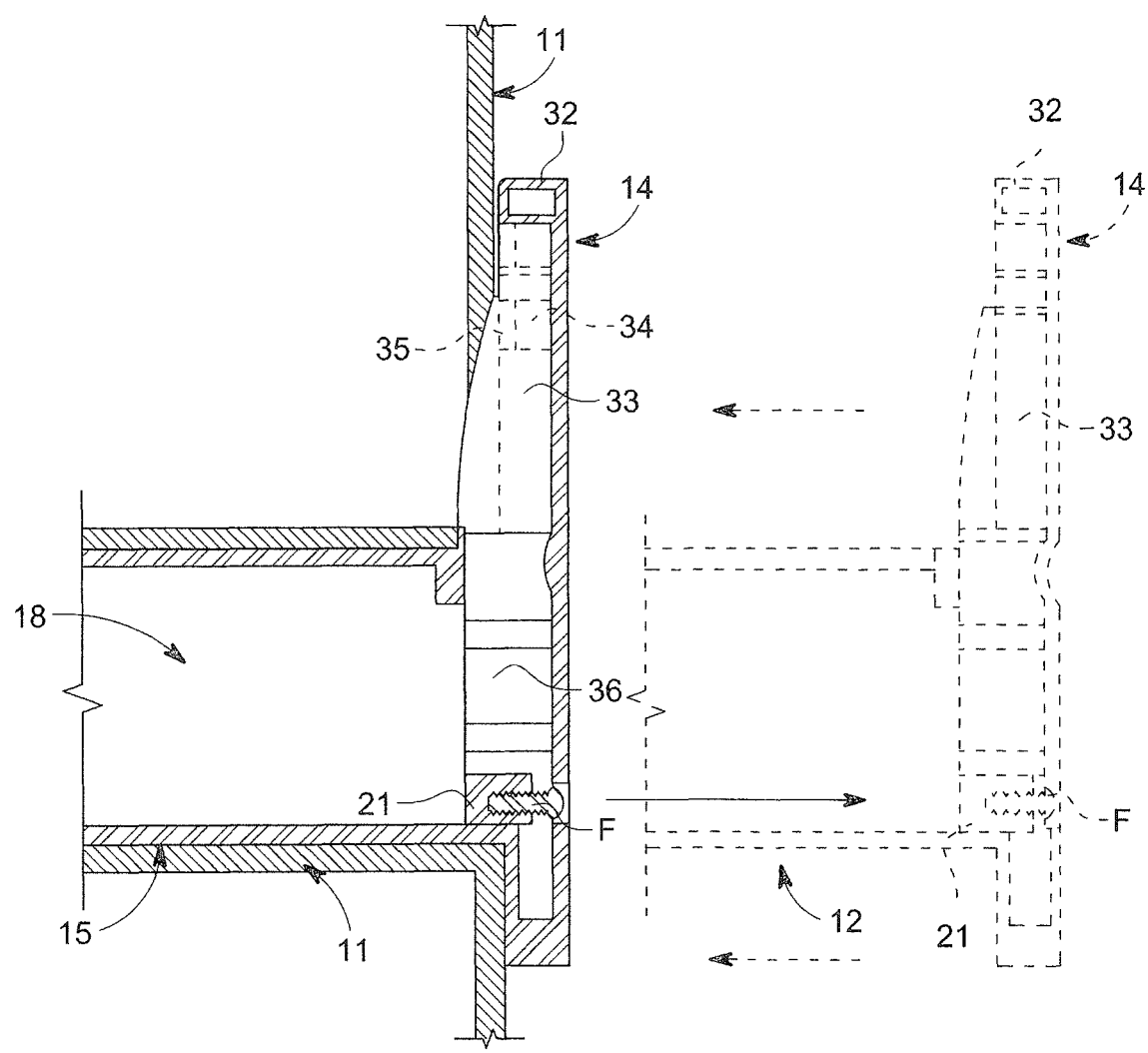
FIG. 10 is a partial sectional view illustrating storage container placement within the tractor attachment and removal position in broken lines.

In application use as seen in FIGS. 9 and 10 of the drawings, the assembled storage container 10 is selectively inserted within cylindrical openings 36A and 37A which are formed within the hydraulic front loader frame assembly LF of the tractor 11. The cylindrical openings 36A and 37A are the result of the fabrication structure of the hydraulic support front loader frame LF and are of a known interior dimension so as to accommodate the known exterior dimension of a storage container end portion 13.

It will therefore be evident that the attachment end portion 14 is therefore of a greater dimension so as to engage the respective surfaces about the openings 36A and 37A and thereby magnetically attach thereto as illustrated in solid lines in FIG. 9 of the drawings and be removed or inserted therein as illustrated in broken lines.

It will thus be seen that a new and novel storage container for use with a tractor or the like has been illustrated and described and that various changes and modifications may be made thereto without departing from the spirit of the invention.

Therefore, we claim:

1. A portable storage container for tractors and related equipment comprising, an elongated contoured housing portion having upstanding attachment end and an oppositely disposed closure end portion, said housing portion has a contoured interior integral curved spaced parallel sidewalls defining a half cylinder open to housing, said attachment end portion having a plurality of magnets for magnetically engaging with a portion of the tractor and related equipment for retainment there within.

2. The portable storage container set forth in claim 1 wherein said tractor and related equipment having cylindrical openings in hydraulic equipment thereon to receive said storage container there within, and said openings in hydraulic equipment are of an internal diameter greater than that of said exterior diameter of said housing portion and said oppositely disposed closure end portion.

\* \* \* \* \*